(12) United States Patent
Saklatvala

(10) Patent No.: US 10,013,807 B2
(45) Date of Patent: Jul. 3, 2018

(54) AUGMENTED REALITY

(71) Applicant: AURASMA LIMITED, Bracknell (GB)

(72) Inventor: George Saklatvala, Cambridge (GB)

(73) Assignee: Aurasma Limited, Bracknell (GB)

( * ) Notice: Subject to any disclaimer, the term of this patent is extended or adjusted under 35 U.S.C. 154(b) by 219 days.

(21) Appl. No.: 14/900,894

(22) PCT Filed: Jun. 27, 2013

(86) PCT No.: PCT/EP2013/063559
§ 371 (c)(1),
(2) Date: Dec. 22, 2015

(87) PCT Pub. No.: WO2014/206475
PCT Pub. Date: Dec. 31, 2014

(65) Prior Publication Data
US 2016/0140765 A1 May 19, 2016

(51) Int. Cl.
*G06T 19/00* (2011.01)
*G06F 17/30* (2006.01)
(Continued)

(52) U.S. Cl.
CPC ...... *G06T 19/006* (2013.01); *G06F 17/30038* (2013.01); *G06F 17/30047* (2013.01);
(Continued)

(58) Field of Classification Search
CPC ......... G06F 17/30864; G06F 17/30867; G06F 17/30554; G06F 17/30047;
(Continued)

(56) References Cited

U.S. PATENT DOCUMENTS

2003/0135488 A1 7/2003 Amir et al.
2006/0004892 A1 1/2006 Lunt et al.
(Continued)

FOREIGN PATENT DOCUMENTS

WO WO-2013023706 2/2013

OTHER PUBLICATIONS

Gammeter, S. et al., Server-side Object Recognition and Client-side Object Tracking for Mobile Augmented Reality, (Research Paper), Conference on Computer Vision and Pattern Recognition Workshops, Jun. 13-18, 2010, pp. 1-8.
(Continued)

*Primary Examiner* — Jeffrey Chow
(74) *Attorney, Agent, or Firm* — HP Inc. Patent Department

(57) ABSTRACT

A method for object recognition performed by a computing device of an augmented reality system. The method includes receiving an image from a user, determining channels that a user is subscribed to, and determining a list of servers that host the channels that the user is subscribed to by using groups of channels that are distributed among a cluster of servers. The method further includes selecting, using the computing device, which servers from the list of servers are to be used to query the channels that the user is subscribed to. In addition, the method includes querying, using the computing device, the selected servers for the channels that the user is subscribed to with the image to determine at least one object that matches the image from object databases for the channels that the user is subscribed to. The method also includes retrieving and sending content associated with the at least one object.

14 Claims, 5 Drawing Sheets

(51) Int. Cl.
*G06K 9/00* (2006.01)
*G06K 9/62* (2006.01)

(52) U.S. Cl.
CPC .. *G06F 17/30247* (2013.01); *G06F 17/30598* (2013.01); *G06F 17/30864* (2013.01); *G06K 9/00624* (2013.01); *G06K 9/6201* (2013.01)

(58) Field of Classification Search
CPC ......... G06F 17/30247; G06F 17/30619; G06F 9/3012; G06F 9/30123; G06Q 30/0251; G06Q 30/0277; G06Q 30/0643
See application file for complete search history.

(56) References Cited

U.S. PATENT DOCUMENTS

| | | |
|---|---|---|
| 2008/0080745 A1 | 4/2008 | Vanhoucke et al. |
| 2009/0111434 A1* | 4/2009 | Yu .......................... H04L 51/14 455/414.1 |
| 2009/0232354 A1* | 9/2009 | Camp, Jr. ............. G06Q 30/02 382/103 |
| 2009/0300122 A1 | 12/2009 | Freer |
| 2010/0023878 A1* | 1/2010 | Douris ................ H04L 12/6418 715/757 |
| 2011/0110581 A1 | 5/2011 | Yang et al. |
| 2011/0221769 A1 | 9/2011 | Leung et al. |
| 2011/0221771 A1* | 9/2011 | Cramer ................. G06Q 30/02 345/633 |
| 2011/0306387 A1 | 12/2011 | Moon |
| 2012/0098859 A1 | 4/2012 | Lee et al. |
| 2014/0247283 A1* | 9/2014 | Jo ......................... G06T 11/001 345/633 |
| 2014/0278998 A1* | 9/2014 | Systrom ............. G06Q 30/0277 705/14.57 |
| 2017/0235848 A1* | 8/2017 | Van Dusen ....... G06F 17/30979 705/12 |

OTHER PUBLICATIONS

Kachouri, R. et al: "Multi-model classification method in heterogeneous image databases", Pattern Recognition, Elsevier, Gb, vol. 43, No. 12, Dec. 1, 2010 (Dec. 1, 2010), pp. 4077-4088, XP027260732).
Sherman, Erik "New Facebook Patent: the Huge Implications of Curated Search [update]", Internet citation, Mar. 15, 2011 (Mar. 15, 2011), pp. 1-5, Retrieved from the Internet: URL: http://www.cbsnews.com/8301-505124162-43449274/new-facebook-patent-the-huge-implications-of-curated-search-update/?tag=bnetdomain [retrieved on Jun. 13, 2013].
PCT International Search Report and Written Opinion, dated Apr. 4, 2014, PCT Application No. PCT/EP2013/063559, European Patent Office, 14 pages.

\* cited by examiner

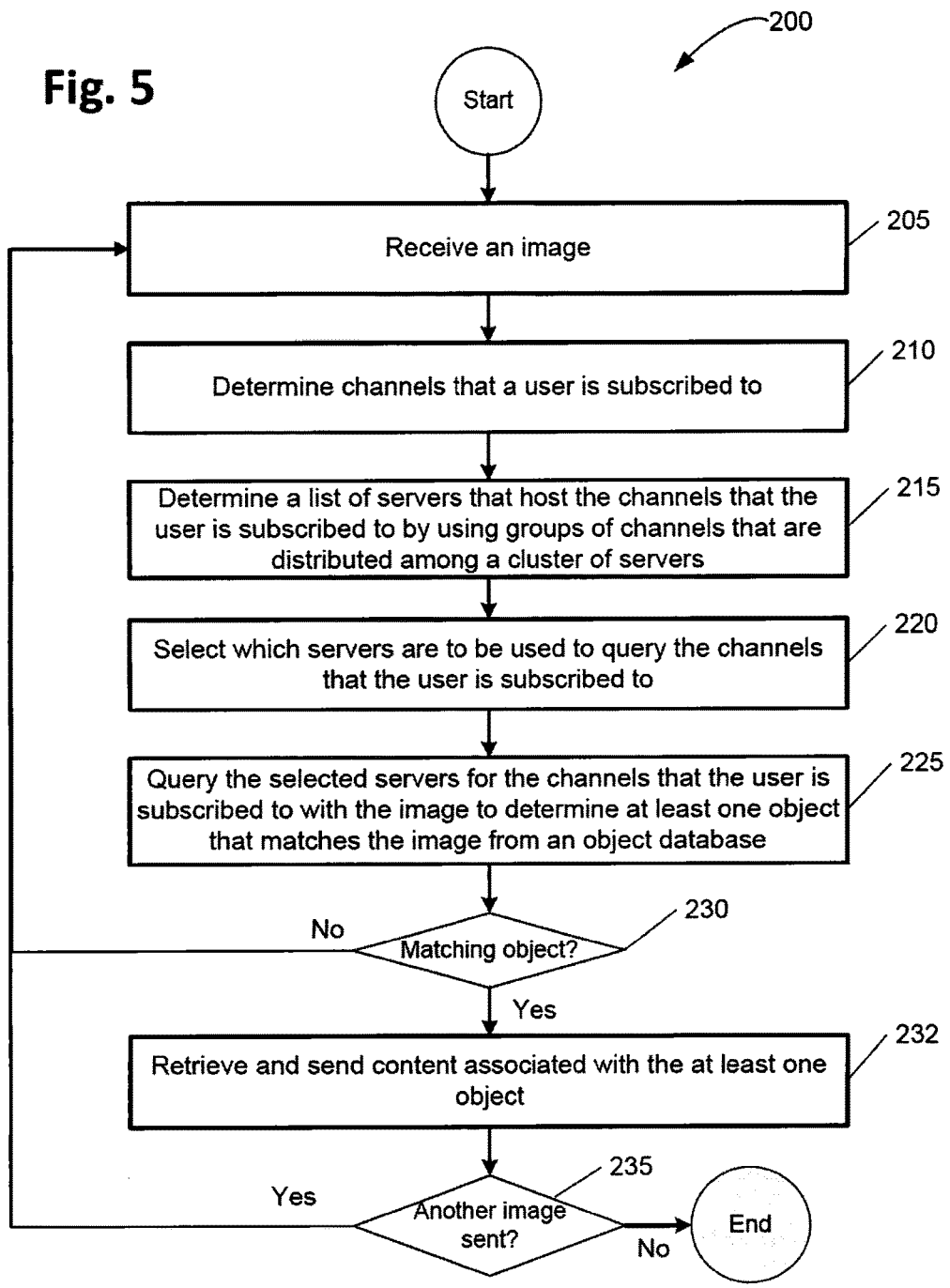

AUGMENTED REALITY

CROSS-REFERENCE TO RELATED APPLICATION

This application is a U.S. National Stage Application of and claims priority to International Patent Application No. PCT/EP2013/063559, filed on Jun. 27, 2013, and entitled "AUGMENTED REALITY," which is hereby incorporated by reference in its entirety.

BACKGROUND

Augmented reality ("AR") generally refers to an environment or a system for displaying objects of the real world (e.g., physical objects) that are augmented or otherwise supplemented using virtual objects (e.g., digital media like video, images, graphics, etc.). AR devices and systems have become very popular over the past years because AR technology enables objects and information from the real world to become interactive by supplementing them with virtual content. Further, web based communication technologies have also dramatically improved in the recent years. Increasing numbers of today's users carry one or more mobile devices that are capable of executing AR applications and functions.

BRIEF DESCRIPTION OF THE DRAWINGS

FIG. 5 illustrates a flow chart showing an example of a method for object recognition.

DETAILED DESCRIPTION

Figure 1:
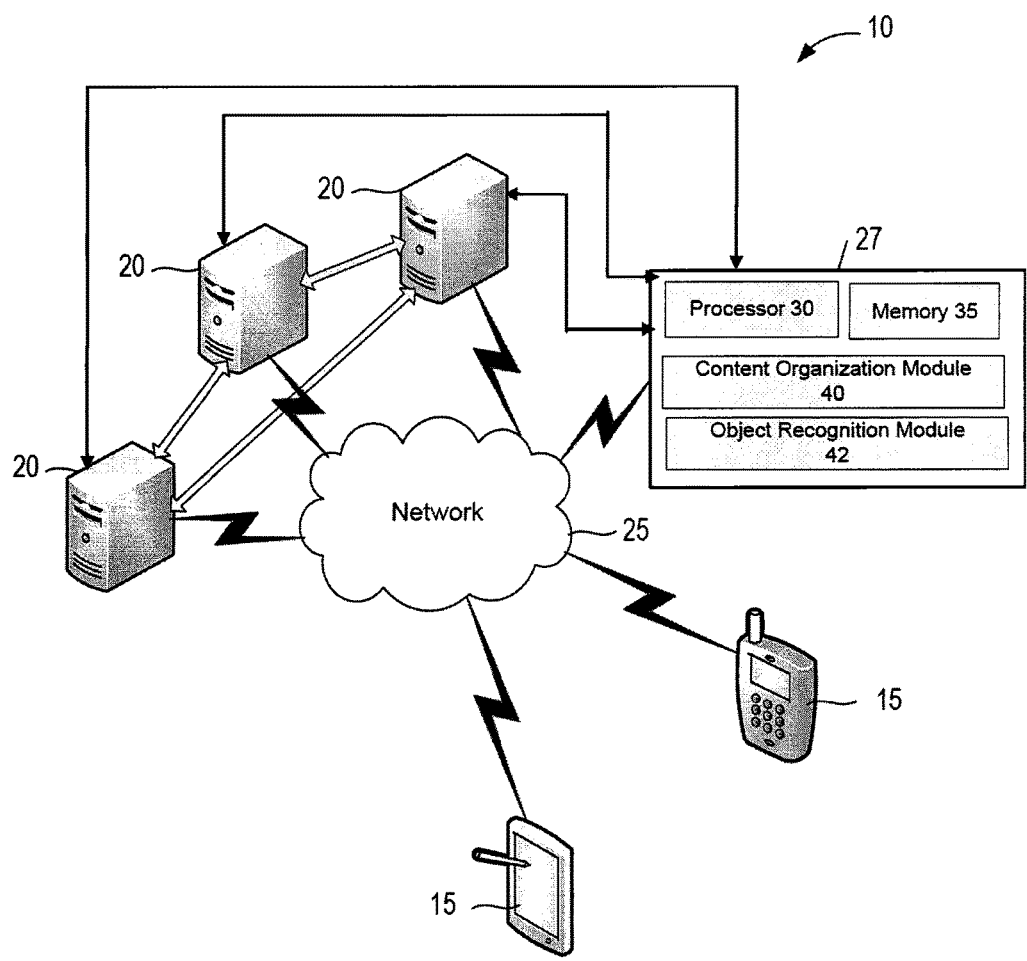
FIG. 1 is a schematic illustration of an example of a system for organizing virtual content and for object recognition based on an image.

With the recent improvements in technology, increased number of users can take advantage of various AR devices and systems. For example, users can utilize their mobile devices to enable objects from the real world to become interactive by supplementing them with virtual content. Various devices such as Internet-enabled tablets, smart phones, laptops, televisions, and gaming consoles allow increased number of users to be able to access the AR systems more frequently and from different locations.

As the value and use of AR technologies continues to increase, the owners of the AR implementation systems look for efficient and cost effective ways to operate these systems. The increased use of AR systems leads to a greater amount of virtual content that needs to be stored and maintained by the operators of the AR systems. In many situations, the large amount of virtual content that is stored on the AR systems affects the responsiveness and the operations of these AR systems, as well as their communications with the devices operated by the different users. Therefore, the operators of the AR systems may try to improve upon ways to store, manage, and process the data used in the AR systems.

An augmented reality system or application often involves the delivery of visual content (e.g., video, images, graphics, or the like) to a user based on recognition of an object (image, logo, building, face, etc.) from the real world. Depending on the size of the AR system and the number of users, the total number of objects and the virtual content associated with these object in an AR environment may be very large. In some examples, each user of the AR system may be able to view different subsets of the virtual content associated with the real world object based on subscription policies. Downloading descriptors (i.e., data used to match an object to images) associated with all virtual content to the user's mobile device may not be preferred because these mobile devices usually have limited memory and there is a long initial download time. Further, having a single large object database used to filter the objects associated with a user based on a subscription may be inefficient because it may include a large number of objects that a user is not subscribed to.

Therefore, it may be beneficial to have an AR system that is efficient (i.e., involves little or no unnecessary processing), load balanced (i.e., the load is distributed between all servers in the database), scalable (i.e., can accommodate potentially unlimited numbers of objects), highly available, and tolerant of component failure. Described herein are techniques for organizing content in an AR system and for object recognition performed by the AR system. The techniques may include creating a distributed architecture of the objects and the virtual content associated with the objects, which may allow an efficient object matching technique to be used by the system. This may limit or avoid unnecessary processing and may also improve load balancing between the servers of the system.

In some implementations, the description proposes grouping a plurality of descriptors associated with a plurality of objects and content related to the objects into a plurality of channels and storing the plurality of descriptors associated with the objects in the channels in a plurality of object databases located in a memory. The description further proposes determining a memory cost associated with each channel, determining a processing cost associated with each channel, and combining the plurality of channels into groups of channels based on the memory cost and the processing cost. Each of groups of channels may be balanced to have approximately the same memory cost and approximately the same processing cost. The description also proposes allocating the groups of channels on a plurality of servers in the system.

In other example implementations, the description proposes receiving an image from a user (e.g. from a user's mobile device), determining channels that a user is subscribed to, and determining a list of servers that host the channels that the user is subscribed to by using groups of channels that are distributed among a cluster of servers. The description further proposes selecting which servers from the list of servers are to be used to query the channels that the user is subscribed to. The description also proposes querying the selected servers for the channels that the user is subscribed to with the image to determine at least one object that matches the image from object databases for the channels that the user is subscribed to. The description further proposes retrieving and sending content associated with the at least one object As used herein, the terms "mobile device" and "wireless device" may be used interchangeably and refer to any one of various smart-phones, cellular telephones, tablets, laptop computers, personal data assistants (PDA's), VoIP phones, wireless enabled televisions, wireless enabled entertainment systems, and other similar electronic devices that include a processor and are capable of sending and receiving wireless or wired communication signals.

In addition, as used herein the term "object" refers to a real world marker (e.g., image, logo, building, book, face, etc.) that is recognized or identified by the AR system based on an image received from a user of the system. The terms "content" or "virtual content" may be used interchangeably and refer to any combination of text, video, images, graphics, audio, or any other suitable digital media output that is related to a specific object identified by the AR system.

Further, as used herein, the term "descriptor" refers to data or information that is used to identify an object in an image received by the AR system. In other words, a descriptor includes data used to determine whether an object is present in an image received from a user. In one example, a descriptor can be extracted from images of the object or any other data related to the object. For example, the descriptor may include a collection of point features and the associated geometry for an object derived from an image (e.g., the position of corners of a building in an image). In the AR system each descriptor is associated with an object and is linked to content related to the object.

As used herein, the term "channel" refers to a dynamic collection of content and descriptors stored in the AR system. A channel includes a plurality of descriptors associated with a plurality of objects and content related to each of the objects. In the AR system, each channel may be automatically created on the servers of the system from content uploaded by users (e.g., content creator users) and from object descriptors trained from images also uploaded by these users. Depending on the implementation of the AR system, the descriptors of each channel may be stored in the memory of the servers of the AR system, or may be stored in a central database, which may or may not be the same database as used to store the content.

As used herein, the term "automatically" refers to acting or operating in a manner essentially independent of external human influence or control. A system, an element of a system, or an application may have the capability to start, operate, perform functions, etc., independently of specific requests or regulations.

Further, as used herein, the term "communication interface" refers to various protocols available to any of the wireless devices to communicate with each other and/or with a network. In particular, the communications interface may include Wi-Fi, Bluetooth, 3G, 4G, and/or any other appropriate communications interface or combinations of interfaces.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

FIG. 1 is a schematic illustration of an example of an AR system 10 for organizing virtual content and for object recognition based on an image. The system 10 includes at least one mobile device 15 (or any other appropriate electronic device like a PC, etc.), a plurality of servers 20, a computing device 27, and a network 25. In the illustrated example, the mobile devices 15 include a tablet and a smart-phone operated by a user (not shown). In alternative examples, the user can own or operate different electronic devices (e.g., PCs) or wireless devices (e.g., cellular telephones, laptops, PDAs, wireless televisions, wireless entertainment systems, and other similar wireless devices).

Each of the mobile devices 15 includes software, hardware (e.g., processor, memory, etc. not shown), or a suitable combination thereof configured to enable functionality of the mobile devices 15 and to allow them to interact with the plurality of servers 20 or other devices. For example, the mobile devices 15 include communication interfaces that are used to connect with the other wireless devices and/or to a network. The communication interfaces of the mobile devices 15 may include a Wi-Fi interface, a Bluetooth interface, a 3G interface, a 4G interface, a near filed communication (NFC) interface, and/or any other suitable interface.

The plurality of servers 20 may generally be controlled and operated by an operator of the AR system. The plurality of servers 20 include software, hardware (e.g., processor, memory, etc. not shown), or a suitable combination thereof configured to enable functionality of the servers 20 and to allow them to interact with the mobile device 15 or other devices. For example, the plurality of servers 20 include communication interfaces that are used to connect with the other devices and/or to a network.

At least one of the plurality of servers 20 is connected to the computing device 27. The computing device 27 can be internal to one of the plurality of servers 20 or can be also external to the plurality of servers 20. Alternately, the functions performed by the computing device 27 described below can be performed by a processor of one of the plurality of servers 20. In the illustrated example, the computing device 27 includes a processor 30, a memory 35, a content organization module 40, and an object recognition module 42 for organization of the virtual content and for object recognition performed by the system 10.

The mobile devices 15 are connected to the plurality of servers 20 via the network 25 so the mobile devices 15 can transmit data (e.g., images, etc.) to the plurality of servers 20 and the plurality of servers 20 can transmit information to the mobile devices 15. The network 25 may include any suitable type or configuration of network to allow the plurality of servers 20 to communicate with the mobile devices 15 and/or any other systems or devices.

For example, the network 25 may include a wide area network ("WAN") (e.g., a TCP/IP based network, a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a Digital Enhanced Cordless Telecommunications ("DECT") network, a Digital AMPS ("IS-136/TDMA") network, or an Integrated Digital Enhanced Network ("iDEN") network, etc.). The network 25 can further include a local area network ("LAN"), a neighborhood area network ("NAN"), a home area network ("HAN"), a personal area network ("PAN"), a public switched telephone network ("PSTN"), an Intranet, the Internet, or any other suitable network.

The computing device 27 provides functionality to operate plurality of servers 20 and to collect and process the data received from the mobile devices 15 and/or any other devices external to the plurality of servers 20. It is to be understood that the operations described as being performed by the computing device 27 that are related to this description may, in some implementations, be performed by any other computing device or a processor associated with the plurality of servers 20 or the mobile devices 15.

As described in additional detail below, in one example, the computing device 27 groups a plurality of descriptors associated with a plurality of objects and content related to each of the objects into a plurality of channels and stores the plurality of descriptors associated with the objects in each channel in an object database located in a memory. The computing device 27 determines a memory cost associated with each channel, determines a processing cost associated with each channel, and combines the plurality of channels into groups based on the memory cost and the processing cost. Each group of channels has approximately the same memory cost and approximately the same processing cost. The computing device 27 also allocates the groups of channels on the plurality of servers.

Figure 2:
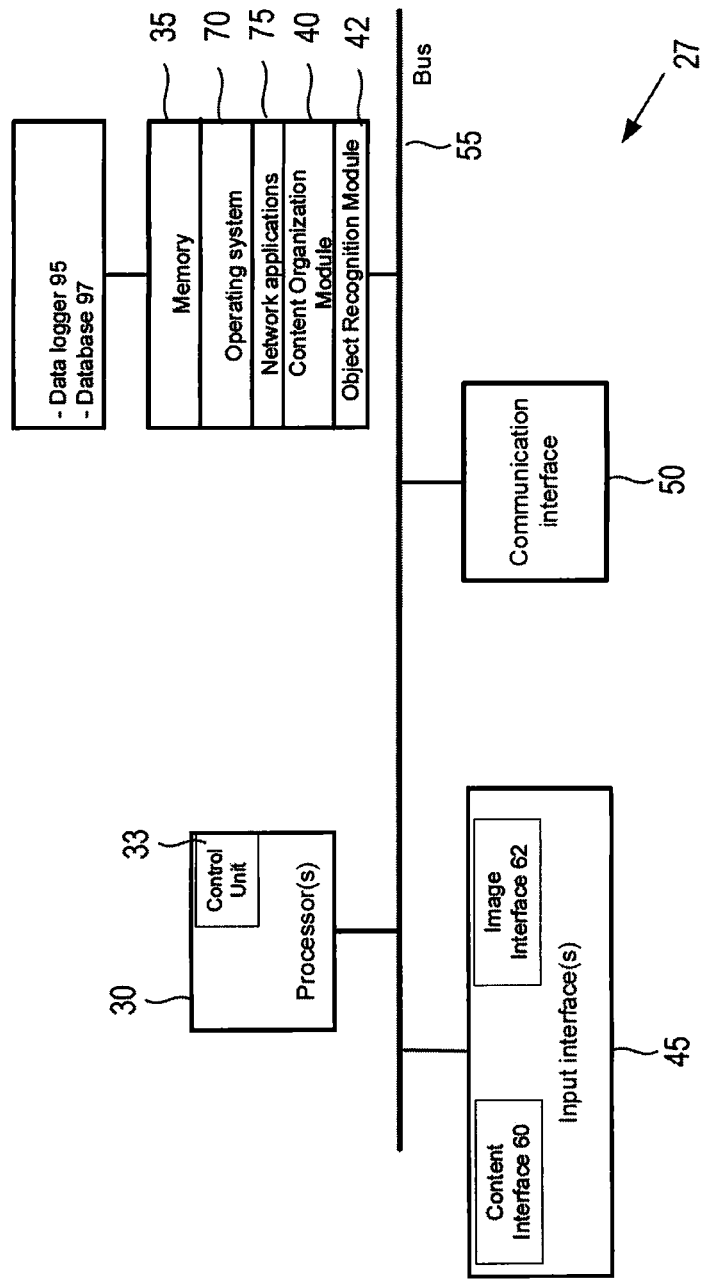
FIG. 2 illustrates a schematic representation showing an example of a computing device of the system of FIG. 1.

FIG. 2 shows a schematic representation of the computing device 27 of the system 10. It is to be understood that any other computing device may also be used to implement portions or all of the functionality of the computing device 27. The computing device 270 can be a server (e.g., one of the servers 20), a desktop computer, a laptop, or any other suitable device capable of carrying out the techniques described below. The computing device 270 can be a device that is independent from the servers 20 or can be included in one of the servers 20. The computing device 270 includes a processor 30 (e.g., a central processing unit, a microprocessor, a microcontroller, or another suitable programmable device), a memory 35, input interfaces 45, and a communication interface 50. Each of these components is operatively coupled to a bus 55. In other examples, the computing device 270 includes additional, fewer, or different components for carrying out similar functionality described herein.

The communication interface 50 enables the computing device 270 and the server 20 (when the computing device is integrated into the server) to communicate with a plurality of networks and communication links. Each of the plurality of servers 20 also includes a communication interface. The input interfaces 45 can process information from the mobile devices 15, and other external devices/systems. In one example, the input interfaces 45 include at least a content interface 60 and an image interface 62. In other examples, the input interfaces 45 can include additional interfaces. The content interface 60 receives various content (e.g., video, images, graphics, etc.) associated with different object from the mobile device 15 or from other external devices (e.g., PCs, etc.). For example, the content interface 60 can receive a restaurant menu or images of different dishes when the virtual content is associated with objects from a specific restaurant.

The image interface 62 receives various images from the mobile devices 15 or from other electronic devices. For example, the image interface 62 can receive images from a user (not shown) of the AR system at the time the user wants to receive an interactive content related to an object (e.g., restaurant name sign) included in the image. The system 10 recognizes an object in that image and can provide virtual content associated with the object to the user. In addition, the image interface 62 can receive images used by the system 10 to derive descriptors associated with the different objects. The input interfaces 45 can include, for example, a connector interface, a storage device interface, or a local or wireless communication port which receives the information from the mobile devices 15. In one example, the virtual content and images received from the mobile device 15 or other devices can be used to create or supplement databases stored in the memory 35.

The processor 30 includes a control unit 33 and may be implemented using any suitable type of processing system where at least one processor executes computer-readable instructions stored in the memory 35. The memory 35 includes any suitable type, number, and configuration of volatile or non-transitory machine-readable storage media 37 (shown in FIG. 3) to store instructions and data. Examples of machine-readable storage media 37 in the memory 35 include read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, an SD card, and other suitable magnetic, optical, physical, or electronic memory devices. The memory 35 may also be used for storing temporary variables or other intermediate information during execution of instructions to be executed by processor 30.

The memory 35 may also store an operating system 70, such as Mac OS, MS Windows, Unix, or Linux; network applications 75; and various modules (e.g., the content organization module 40, the object recognition module 42, etc.). The operating system 70 can be multi-user, multiprocessing, multitasking, multithreading, and real-time. The operating system 70 can also perform basic tasks such as recognizing input from input devices, such as a keyboard, a keypad, or a mouse; sending output to a projector and a camera; keeping track of files and directories on memory 35; controlling peripheral devices, such as printers, image capture device; and managing traffic on the bus 55. The network applications 75 include various components for establishing and maintaining network connections, such as computer-readable instructions for implementing communication protocols including TCP/IP, HTTP, Ethernet, USB, and FireWire.

The machine-readable storage media are considered to be an article of manufacture or part of an article of manufacture. An article of manufacture refers to a manufactured component. Software stored on the machine-readable storage media and executed by the processor 30 includes, for example, firmware, applications, program data, filters, rules, program modules, and other executable instructions. The control unit 33 retrieves from the machine-readable storage media and executes, among other things, instructions related to the control processes and methods described herein.

Figure 3:
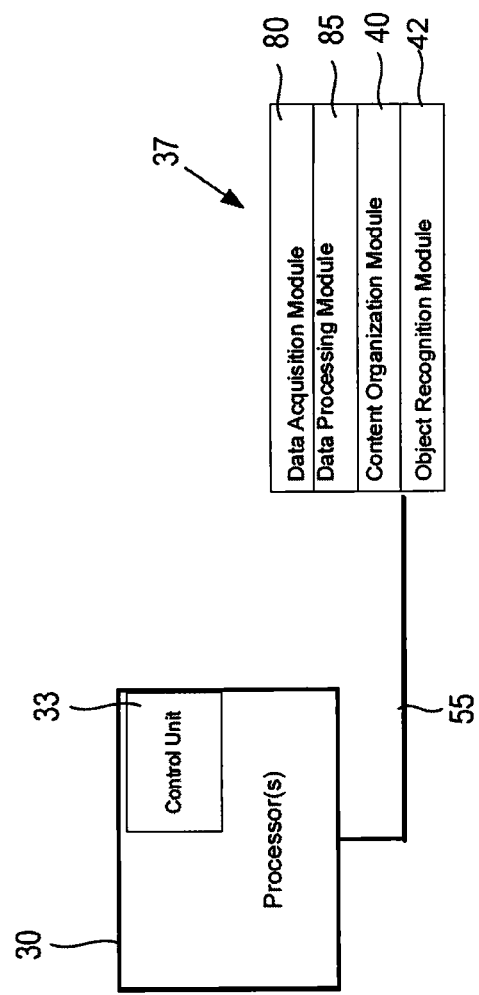
FIG. 3 is a schematic illustration showing an example of a machine-readable storage medium encoded with instructions executable by a processor of the computing device of the system of FIG. 1.

FIG. 3 illustrates an example of a machine-readable storage medium 37 encoded with instructions executable by the processor 30 of the system 10. In one example, the machine-readable storage medium 37 includes a data acquisition module ("DAQ") 80, a data processing module 85, the content organization module 40, and the object recognition module 42. In other examples, the machine-readable storage medium 37 can include more or fewer modules (e.g., various other modules related to the operation of the system 10). As explained in additional detail below, the content organization module 40 provides various computer-readable instruction components for organizing and storing the content in the system 10 so the system is efficient, load balanced, and scalable. Further, the object recognition module 42 provides various computer-readable instruction components for executing an efficient object matching algorithm and recognizing an object based on an image received by the servers 20 of the system 10.

In one example, each of the mobile devices 15 also includes an AR module (not shown on the mobile devices 15) that communicates with the modules in the computing device 27. The AR module on each mobile device 15 may be implemented in the form of a mobile application. In some examples, the mobile device 15 downloads the mobile application (i.e., as a software application) via an online store, the device's manufacturer's website, via a dedicated server, etc. The software application at the mobile device 15 includes a software interface (not shown) where a user of the mobile device can upload an image and send it to the servers 20.

Information and data associated with the system 10, the mobile devices 15, servers 20, and other systems/devices can be stored, logged, processed, and analyzed to implement the control methods and processes described herein. In addition to the data acquisition module 80, the memory 35 includes a data logger or recorder 95 and at least one database 97. Further, the system 10 can also include other databases (not shown) in any of the servers 20. The DAQ module 80 receives information or data from the mobile devices 15, the servers 20, and from various external devices or systems connected to the servers 20. In one example, the DAQ module 80 receives content related to a variety of objects from various content creator users and also receives images from inquiry users (which in some situations may also be content creator users).

The information gathered by the DAQ module 80 is provided to the data processing module 85 and the data logger or recorder 95. The data processing module 85 processes the information gathered by the DAQ module 80 or generated by the system 10. The data logger or recorder 95 stores the information (e.g., the received content, images, etc.) in the database 97 for further storage and processing. In the database, the received information from mobile device 15 or another device can be correlated with an identification record for easier access and retrieval. In one example, the database 97 is included in the memory 35 of the computing device 270. In another example, the database 97 is a remote database (i.e., not located in the computing device 27). In that example, the data logger or recorder 95 provides the information through a network (e.g., the network 25) to the database 97. As explained in additional detail below, the information gathered by the DAQ module 80 can be used to generate a plurality of channels (not shown) stored in the system 10.

Therefore, the information and data stored in the database 97 and other databases the system 10 can be accessed by the computing device 27 for processing. For example, by using the methods described below, the computing device 27 may execute a process for object recognition based on an image received from a user. The control unit 33 retrieves from the machine-readable storage media and executes, among other things, instructions related to the control processes and methods described herein. When executed, the instructions cause the control unit 33 to distribute groups of channels among a plurality of servers, where the groups of channels have approximately the same memory cost and approximately the same processing cost.

Further, the instructions cause the control unit 33 to receive an image from a user, to determine channels that are associated with the user, and to determine a list of servers that host the channels that are associated with the user by using the groups of channels that are distributed among the plurality of servers The instructions also cause the control unit 33 to select which servers from the list of servers are to be used to query the channels that are associated with the user. The instructions cause the control unit 33 to query, with the image, the selected servers for the channels that are associated with the user to match the image to at least one object from object databases for the channels that are associated with the user. Finally, the instructions cause the control unit 33 to retrieve a content associated with the object.

Figure 4:
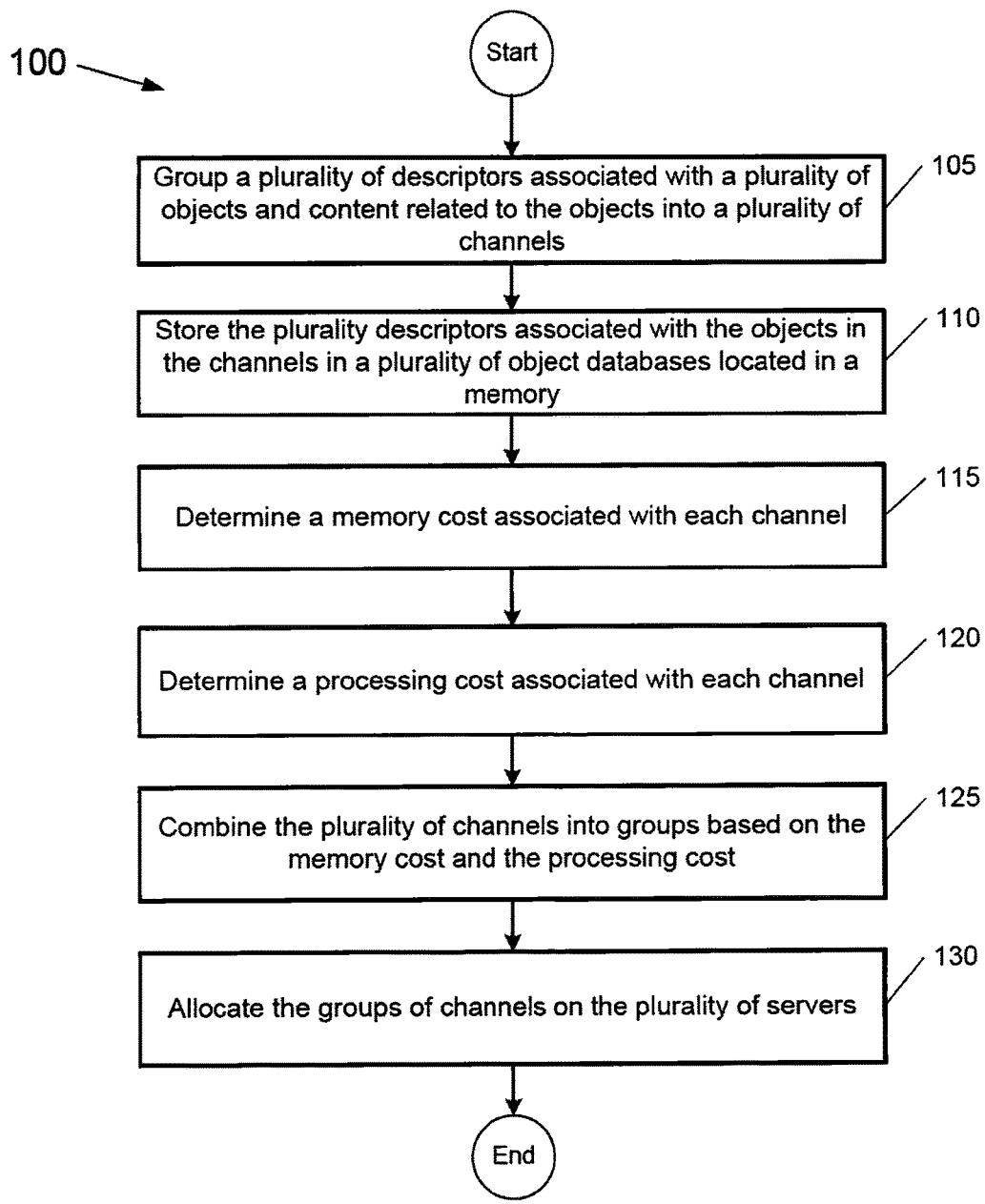
FIG. 4 illustrates a flow chart showing an example of a method for organizing virtual content.

FIG. 4 illustrates a flow chart showing an example of a method 100 for organizing virtual content in the system 10. In one example, the method 100 can be executed by the control unit 33 of the processor of the computing device 27. In another example, the method 100 can be executed by a control unit of a processor of any of the servers 20. Various steps described herein with respect to the method 100 are capable of being executed simultaneously, in parallel, or in an order that differs from the illustrated serial manner of execution. The method 100 is also capable of being executed using additional or fewer steps than are shown in the illustrated examples.

The method 100 may be executed in the form of instructions encoded on a non-transitory machine-readable storage medium 37 executable by a processor 30 of the computing device 27. In one example, the instructions for the method 100 are stored in the content organization module 40.

The method 100 begins at step 105, where the control unit 33 groups a plurality of descriptors associated with a plurality of objects and content related to the objects into a plurality of channels. Thus, each channel created by the system 10 includes a plurality of descriptors associated with a plurality of objects that are linked to content related to each of the objects. In some examples, the system 10 includes two types of users: content creator users and inquiry users. Both types of users may need to register with the AR system 10 (i.e., by creating a user account). Content creator users may also upload content to the system 10 by sending the content via any external device (e.g., laptop, smart phone, etc.).

One example of a content creator user is a restaurant that wants to be able to present its menu and dishes interactively to inquiry users via the AR system. A content creator user registers with the system, creates an account, and transmits content to one of the servers 20. The system 10 (e.g., by using the computing device 27 or another processor on the servers 20) automatically creates a channel for that user where the channel includes various descriptors associated with objects related to the restaurant. The content received by the system 10 is associated with different objects (e.g., restaurant entry door, name sign, etc.) via the descriptors generated by the system and the objects can be identified in images provided by the inquiry users.

As noted above, the channels also include descriptors associated with these objects. The descriptors include data used to determine whether an object is present in an image received from a user. These descriptors may be derived from images provided by the different users of the system or otherwise or otherwise generated by the system. In one example, the descriptors can include a collection of point features and the associated geometry for an object derived from an image. Other types of descriptors may also be used. In the channels, each descriptor is associated with an object and is linked to content related to the object. In some examples, the system 10 includes a large number of channels (e.g., hundreds of thousands or even millions). The channels can be of different sizes and some channels are associated with more inquiry users than other channels. The channels can be automatically updated by the system 10 so any future content that is related to that user is automatically included in the channel for the user. Depending on the implementation of the AR system, the descriptors of each channel may be stored in the RAM of the servers of the AR system, or may be stored in a central database, which may or may not be the same database as used to store the content.

When an inquiry user creates an account with the system 10, the inquiry user may indicate interest in specific content creator (e.g. specific restaurant). That way, the system 10 automatically subscribes or associates the inquiry users with the channel related to the content creator. Further, any time that an inquiry user uploads an image to the system 10 and the system identifies an object in the image, the system 10 automatically subscribes or associates the inquiry users with the channel related to the object. In one example, each user is subscribed to or associated with a specific number of channels. Thus, the channels indicate to the system 10 which users can receive content associated with specific channels. If all the channels (i.e., descriptors and content associated with an image) are stored in a single database, an image uploaded by a user needs to be matched against a large number of channels and descriptors. That slows down the operation of the system 10.

With continued reference to FIG. 4, the control unit 33 then stores the plurality of descriptors associated with the objects in the channels in a plurality of object databases located in a memory (e.g., RAM) of the plurality of servers (at step 110). Thus, each database includes descriptors for a plurality of objects. The content associated with the descriptors may be stored in persistent storage (e.g., disc, etc.) of the servers 20 or in another external database. In one example, the control unit 33 may create a plurality of object databases that correspond to the number of channels in the system 10. As explained in additional detail below, the object databases are used for matching an object in an image received from a user with a descriptor in the object database in order to retrieve a content related to the object. The different object databases can be stored on the plurality of servers 20, and copies of the object databases can be stored in the RAMs on more than one server 20. Because the object databases with descriptors for each of the channels are stored in the random access memory of the servers 20, this removes the disc input/output and the processing related to object recognition is performed much faster. Further, because each database contains descriptors for a plurality of objects, the time complexity (i.e., the amount of time taken by an algorithm to run as a function of the length of the input) is sub-linear in the number of descriptors.

Next, at step 115, the control unit 33 determines a memory cost associated with each channel in the system 10. In one example, the memory cost associated with each channel identifies the required memory in a server 20 to store all descriptors for the objects in each channel. The memory cost of each channel can be determined by executing a memory cost function based on a number of objects in the channel. Then, the control unit 33 determines a processing cost associated with each channel in the system 10 (at step 120). In one example, the processing cost of each channel is determined by executing a processing cost function based on a number of objects in the channel and based on a number of user subscriptions to the channel. The processing cost of each channel identifies the processing power (e.g., of a server 20) required to host the channel (i.e., how many CPU cycles per unit time is required to host the channel).

In step 125, the control unit 33 combines the plurality of channels into groups, also called "super channels", based on the memory cost and the processing cost. In one example each group of channels has approximately the same memory cost and approximately the same processing cost. Next, in step 130, the control unit 33 allocates or distributes the groups of channels on the plurality of servers. Each of the servers 20 may host more than one group of channels. In one example, the control unit 33 distributes the groups of channels equally across all serves 20. In another example, the, the servers 20 may have different configuration and their memory and processing capabilities may not be equal. In that situation, the control unit 33 distributes the groups of channels in such a way to match the memory/processing power distribution of the servers 20 (e.g., more powerful servers may host more groups of channels and less powerful servers may host less groups of channels). That way, the system 20 achieves balance of processing.

In one example, the control unit 33 uses a hash ring to distribute the groups of channels. Using a hash ring ensures availability of all channels to the computing device 27, equality in the partitioning of the channel data between the servers 20, tolerance to component failure (i.e., where each channel is stored on more than one server, so if one server fails there will be at least one remaining server hosting the channel), and the ability to add or remove channels dynamically (i.e., when a channels is added or removed, the hash ring automatically moves data between the servers so as to maintain the desired level of redundancy). In some examples, the control unit 33 creates several copies of some or all of the groups of channels and allocates them at different servers 20. This proposed organization of the virtual content in the system 10 allows optimal operation of the system 10. Further, as explained in additional detail below, the object databases of the channels and the groups of channels distributed on the servers are used to execute an efficient object recognition method based on an image received from a user.

FIG. 5 illustrates a flow chart showing an example of a method 200 for object recognition performed by the system 10. In one example, the method 200 can be executed by the control unit 33 of the processor of the computing device 27. In another example, the method 200 can be executed by a control unit of a processor of any of the servers 20. Various steps described herein with respect to the method 200 are capable of being executed simultaneously, in parallel, or in an order that differs from the illustrated serial manner of execution. The method 200 is also capable of being executed using additional or fewer steps than are shown in the illustrated examples.

The method 200 may be executed in the form of instructions encoded on a non-transitory machine-readable storage medium executable by a processor 30 of the computing device 27. In one example, the instructions for the method 200 are stored in the object recognition module 40. The method 200 takes advantage of the organization of the virtual content by the system 10.

The method 200 begins at step 205, where the control unit 33 executes instructions to receive an image from a user. The image usually captures a view of the real world and may include objects (e.g., logo, building, etc.). In one example, the image is received from a mobile device 15 (e.g., by using a camera on the mobile device). In other examples, the image may be received from another electronic device (e.g., PC, etc.), where the image is retrieved from a memory of the device. Each image received from a user may be associated with a user ID, which may be generated when a user registers with the system 10.

At step 210, control unit 33 executes instructions to determine channels that a user is subscribed to. As mentioned above, each user may be subscribed to or associated with a different number of channels. In one example, the channels that a user is subscribed to or associated with are determined by querying a database (e.g., an SQL database) stored in the memory (e.g., RAM or disc) of the computing device 27 or the servers 20 based on a user ID. That way, the control unit returns all channels that are associated with that user ID. Next, at step 215, the control unit 33 executes instructions to determine a list of the servers that host each of the channels that the user is subscribed to by using groups of channels (i.e., the super channels) that are distributed among the cluster of servers 20. That way, the control unit 33 does not have to send and compare the image to all channels in every server 20 in the cluster.

In one example, determining the list of servers that host the channels that the user is subscribed to includes querying a database (e.g., a SQL database) that includes the groups of channels that are distributed among the cluster of servers 20. Depending on what information is included in that database, that query may also return list of channels that a user is subscribed to. Alternatively, the list of servers that host the channels that the user is subscribed to may be stored on the client device (mobile device, PC, etc.) and can be uploaded in place of or in addition to the user ID when the user uploads an image. Further, the control unit 33 may send a message to each server 20 inquiring for a list of channels that each server hosts.

Then, at step 220, control unit 33 executes instructions to select which servers (or at least one server), from the list of servers that host the channels that the user is subscribed to, are to be used to query the channels that the user is subscribed to. As mentioned above the same groups of channels may be distributed on different servers and, therefore, each channel may be associated with more than one server (this is accomplished by executing the hash ring that stores multiple copies of the groups of channels on the servers 20). For example, the system 10 may include servers A, B, and C, where server A hosts channel X, server B hosts channel Y, and server C includes hosts channels X and Y. In that case, the control unit 33 may select only server Y to be used to query each channel that the user is subscribed to. That way, there is no extra processing performed by processor 30.

Next, the control unit 33 executes instructions to query the selected servers for the channels that the user is subscribed to with the image to determine at least one object that matches the image from object databases for the channels that the user is subscribed to (at step 225). In one example, the control unit 33 compares the received image with the descriptors stored in the object database for each channel that the user is subscribed to. Because the object databases for the channels are stored on the RAM of the servers, the processor 30 can query the object database faster and without any unnecessary processing (i.e., the disc input/output is removed and the time complexity for the object recognition algorithm is sub-linear in the number of descriptors). By using the descriptors stored in the object databases associated with each channel that the user is subscribed to, the control unit 33 determines whether at least one object associated with the descriptors in the object databases matches the image (at step 232). If at least one object matches the image, the control unit 33 stops the processing and proceeds to step 232. If no object matches the image, the control unit 33 returns to step 205 where the computing device receives another image. The control unit 33 may also generate a message to inform the user that no match to the image was found.

At step 232, the control unit 33 executes instructions to retrieve and send content associated with the at least one object. The descriptors in the object databases are linked to a content associated with the each identified object. The content may be stored at each server (e.g., on a disc) or at another database (i.e., internal or extern al to the system 10). The control unit 33 retrieves the specific content associated with the matching object from the appropriate database by using the identified descriptor from the object database. The control unit 33 then sends the content to the inquiry user that provided the image (e.g., sends to a mobile device 15 or another electronic device). At step 235, the control unit determines whether another image is received from the user. If no image is received, the process 200 ends. If another image is received, the control unit returns to step 205. The proposed method allows the system 10 to efficiently operate with highly heterogeneous channel sizes and user subscriptions without any unnecessary processing.

What is claimed is:

1. A method for object recognition performed by an augmented reality system, the method comprising:
   receiving, by a computing device and from a device of a user, an image;
   determining, by the computing device, channels of content to which the user is subscribed;
   determining, by the computing device, a list of servers in a cluster of servers that host the determined channels of content;
   selecting, by the computing device, at least one server from the determined list of servers to be used to query the channels of content to which the user is subscribed;
   querying, by the computing device, the selected servers for the channels of content to which the user is subscribed with the image to determine at least one object that matches the image from object databases for the channels to which the user is subscribed;
   retrieving, by the computing device, content associated with the determined at least one object; and
   sending, by the computing device, the retrieved content to the user.

2. The method of claim 1, wherein the channels of content include a plurality of descriptors associated with a plurality of objects and content related to the objects, and wherein determining a list of servers that host the channels to which the user is subscribed includes querying a database that includes groups of channels that are distributed among the cluster of servers.

3. The method of claim 2, wherein the groups of channels that are distributed among the cluster of servers are determined by:
   storing descriptors associated with the objects in the channels in a plurality of object databases located in a memory;
   assigning a memory cost to each channel of the channels;
   assigning a processing cost to each channel of the channels;
   combining the channels into the groups of channels based on the assigned memory cost and the assigned processing cost; and
   distributing the groups of channels across the cluster of servers.

4. The method of claim 3, wherein the groups of channels are distributed on different servers, and wherein a descriptor includes data used to determine whether an object is present in an image received from a user device.

5. The method of claim 3, wherein assigning a memory cost to each channel of the channels includes executing a memory cost function based on a number of objects in the channel, and wherein the memory cost of a channel identifies a required memory to store all descriptors for the objects in the channel.

6. The method of claim 3, wherein assigning a processing cost to each channel of the channels includes executing a processing cost function based on a number of objects in the channel and based on a number of user subscriptions to the channel, and wherein the processing cost of a channel identifies a processing power required to host the channel.

7. The method of claim 3, wherein the groups of channels have approximately equal memory cost and processing cost with respect to each other.

8. An augmented reality system, the system comprising:
a plurality of servers; and
a computing device connected to at least one of the plurality of servers, the computing device having a control unit to:
group a plurality of descriptors associated with a plurality of objects and content related to the objects into a plurality of channels;
store the grouped plurality of descriptors associated with the objects in a plurality of object databases located in a memory;
determine a memory cost associated with each channel of the plurality of channels;
determine a processing cost associated with each channel of the plurality of channels;
combine the plurality of channels into groups based on the determined memory cost and the determined processing cost, wherein each of the groups of channels have approximately the same memory cost and approximately the same processing cost with respect to each other, and
allocate the groups of channels on the plurality of servers.

9. The system of claim 8, wherein each descriptor of the plurality of descriptors includes data used to determine whether an object is present in an image received from a user.

10. The system of claim 8, wherein to determine the memory cost associated with a channel of the plurality of channels, the control unit is to execute a memory cost function based on a number of objects in the channel, and wherein the memory cost of each channel identifies a required memory to store all descriptors for the objects in the channel.

11. The system of claim 8, wherein to determine the processing cost associated with a channel of the plurality of channels, the control unit is to execute a processing cost function based on a number of objects in the channel and based on a number of user subscriptions to the channel, and wherein the processing cost of each channel identifies a processing power required to host the channel.

12. A non-transitory machine-readable storage medium encoded with instructions executable by a processor of a computing device of an augmented reality system, the machine-readable storage medium comprising instructions to:
distribute groups of channels among a plurality of servers, wherein the groups of channels have approximately the same memory cost and approximately the same processing cost with respect to each other;
receive an image from a device of a user;
determine channels of content that are associated with the user;
determine a list of servers that host the determined channels that are associated with the user by using the groups of channels that are distributed among the plurality of servers;
select at least one server from the list of servers to be used to query the determined channels that are associated with the user;
query, with the image, the selected at least one server for the determined channels of content that are associated with the user to match the image to at least one object from object databases for the determined channels that are associated with the user;
retrieve a content associated with the object; and
output the retrieved content.

13. The non-transitory machine-readable storage medium of claim 12, wherein the channels of the groups of channels include a plurality of descriptors associated with a plurality of objects and content related to the objects, and wherein each object database includes a plurality of descriptors associated with the objects in each channel.

14. The non-transitory machine-readable storage medium of claim 13, wherein the memory cost of each channel is determined based on a number of objects in the channel to identify a required memory to store all descriptors for the objects in the channel, and wherein the processing cost of each channel is determined based on a number of objects in the channel and based on a number of users associated with the channel to identify a processing power required to host the channel.

* * * * *